United States Patent
Lam et al.

(10) Patent No.: US 10,880,267 B2
(45) Date of Patent: Dec. 29, 2020

(54) VERIFICATION OF DOMAIN EVENTS

(71) Applicant: Afilias PLC, Dublin (IE)

(72) Inventors: Jimmy Lam, Toronto (CA);
Cedarampattu Mohan, Horsham, PA (US); John Kane, Horsham, PA (US); Christy Gnanapragasam, Toronto (CA); Calvin Cheung, Toronto (CA); Hui Zhou, Toronto (CA)

(73) Assignee: AFILIAS LIMITED, Dublin (IE)

( * ) Notice: Subject to any disclaimer, the term of this patent is extended or adjusted under 35 U.S.C. 154(b) by 351 days.

(21) Appl. No.: 15/141,723

(22) Filed: Apr. 28, 2016

(65) Prior Publication Data

US 2017/0317973 A1   Nov. 2, 2017

(51) Int. Cl.
*H04L 29/12* (2006.01)
*H04L 29/06* (2006.01)

(52) U.S. Cl.
CPC ...... *H04L 61/3025* (2013.01); *H04L 61/1511* (2013.01); *H04L 61/302* (2013.01); *H04L 61/3005* (2013.01); *H04L 63/0892* (2013.01); *H04L 63/168* (2013.01)

(58) Field of Classification Search
CPC ............. H04L 61/3005; H04L 61/3015; H04L 61/302; H04L 61/3025; H04L 61/1511; H04L 63/0892; H04L 63/168
See application file for complete search history.

(56) References Cited

U.S. PATENT DOCUMENTS

| | | | |
|---|---|---|---|
| 8,745,718 B1 | 6/2014 | Dufel et al. | |
| 8,769,655 B2* | 7/2014 | Gould | H04L 63/0807 709/223 |
| 2007/0067465 A1* | 3/2007 | Blinn | H04L 29/12066 709/229 |
| 2010/0325723 A1 | 12/2010 | Essawi et al. | |
| 2011/0055248 A1* | 3/2011 | Consuegra | G06F 16/951 707/769 |
| 2012/0174198 A1 | 7/2012 | Gould et al. | |

(Continued)

OTHER PUBLICATIONS

European Patent Office, Extended European Search Report for EP Application No. 17168776.7, dated Sep. 6, 2017, 8 pages.

*Primary Examiner* — Jason D Recek
(74) *Attorney, Agent, or Firm* — Haynes and Boone, LLP (57) ABSTRACT

A method for verifying eligibility of a domain name registrant via a verification web interface for a domain name either registered or in the process of registration with a registrar over a communications network. The method comprising: provide a network link to the registrar or to a registry operator of the domain name; receive an event request for the domain name via the verification web interface including a claim ID associated with the domain name for a domain event; receive a verification request using the network link via the verification web interface including a registrant claim ID and registrant identification information, the registrant claim ID previously provided to the registrant; confirm matching of the registrant claim ID with the claim ID; obtain registrant verification information; access external verification information and compare against the registrant verification information; and send a confirm domain event message or a deny domain event message.

24 Claims, 4 Drawing Sheets

(56) References Cited

U.S. PATENT DOCUMENTS

| | | | |
|---|---|---|---|
| 2016/0119283 A1* | 4/2016 | Ptalis | H04L 61/302 709/223 |
| 2017/0034118 A1* | 2/2017 | Gupta | H04L 43/045 |
| 2017/0187673 A1* | 6/2017 | Kaliski, Jr. | H04L 61/1511 |
| 2017/0195286 A1* | 7/2017 | Stahura | H04L 61/3015 |

* cited by examiner

VERIFICATION OF DOMAIN EVENTS

FIELD

The present invention is related to registration and management of domain names.

BACKGROUND

Proper verification of domain registration eligibility criteria is problematic in today's environment of Internet presence and online community interaction. Companies and individuals need to rely upon trusted online presences, in particular online communities of domain registrants that have a common interest (e.g. all belong to the same international umbrella organization).

What is needed is domain name registration that includes an enforced chain of trust that results in confirmation of a registrant's identity. Further, it is recognised that current domain name registration processes can result in the registration of domain names to registrants based on falsified contact information.

Also recognised is the need for appropriate collection of registrant information that is compatible with the enforced chain of trust, including organizational data that is recognised by or otherwise visible to the online community.

SUMMARY OF THE INVENTION

The present invention provides a system and method of domain event verification to obviate or mitigate at least some of the above presented disadvantages.

A first aspect provided is a system providing a verification process for verifying eligibility of a domain name registrant via a verification web interface for a domain name either registered or in the process of registration with a registrar over a communications network, the system comprising: a computer processor coupled to a memory for implementing instructions stored on the memory to: provide a network link to the registrar or to a registry operator of the domain name, the network link of the communications network for the verification web interface for use by the registrant in connecting with the verification web interface; receive an event request for the domain name via the verification web interface from either the registrar or a registry operator of the domain name, the event request including a claim ID associated with the domain name for a domain event on the domain name; receive a verification request from the registrant using the network link via the verification web interface, the verification request including a registrant claim ID and registrant identification information, the registrant claim ID previously provided to the registrant by the registrar or the registry operator as part of the verification process; confirm matching of the registrant claim ID with the claim ID; obtain registrant verification information; access external verification information and compare against the registrant verification information using a set of verification rules in order to determine whether the eligibility is: confirmed when the registrant verification information matches the external verification information; or unconfirmed when the registrant verification information does not match the external verification information as a result of said compare; and send to either the registrar or the registry operator: a confirm domain event message if the eligibility is confirmed; or deny domain event message if the eligibility is unconfirmed.

A second aspect provided is a method for providing a verification process for verifying eligibility of a domain name registrant via a verification web interface for a domain name either registered or in the process of registration with a registrar over a communications network The method comprising: provide a network link to the registrar or to a registry operator of the domain name, the network link of the communications network for the verification web interface for use by the registrant in connecting with the verification web interface; receive an event request for the domain name via the verification web interface from either the registrar or a registry operator of the domain name, the event request including a claim ID associated with the domain name for a domain event on the domain name; receive a verification request from the registrant using the network link via the verification web interface, the verification request including a registrant claim ID and registrant identification information, the registrant claim ID previously provided to the registrant by the registrar or the registry operator as part of the verification process; confirm matching of the registrant claim ID with the claim ID; obtain registrant verification information; access external verification information and compare against the registrant verification information using a set of verification rules in order to determine whether the eligibility is: confirmed when the registrant verification information matches the external verification information; or unconfirmed when the registrant verification information does not match the external verification information as a result of said compare; and send to either the registrar or the registry operator: a confirm domain event message if the eligibility is confirmed; or a deny domain event message if the eligibility is unconfirmed.

A third aspect provided is a system providing a verification process for verifying eligibility of a domain name registrant via a verification web interface for a domain name registered with a registrar over a communications network, the system comprising: a computer processor coupled to a memory for implementing instructions stored on the memory to: provide a network link to the registrar or to a registry operator of the domain name, the network link of the communications network for the verification web interface for use by the registrant in connecting with the verification web interface; receive an event request for the domain name via the verification web interface from either the registrar or a registry operator of the domain name, the event request including a claim ID associated with the domain name; monitor for a verification request from the registrant using the network link via the verification web interface, the verification request including a registrant claim ID and registrant identification information, the registrant claim ID previously provided to the registrant by the registrar or the registry operator as part of the verification process; determination whether eligibility or not has been concluded by a specified verification period; and send to either the registrar or the registry operator: a process event message if the eligibility is confirmed; or a disregard event message if the eligibility is unconfirmed.

BRIEF DESCRIPTION OF THE DRAWINGS

Exemplary embodiments of the invention will now be described in conjunction with the following drawings, by way of example only, in which.

DETAILED DESCRIPTION OF PREFERRED EMBODIMENTS

Figure 1:
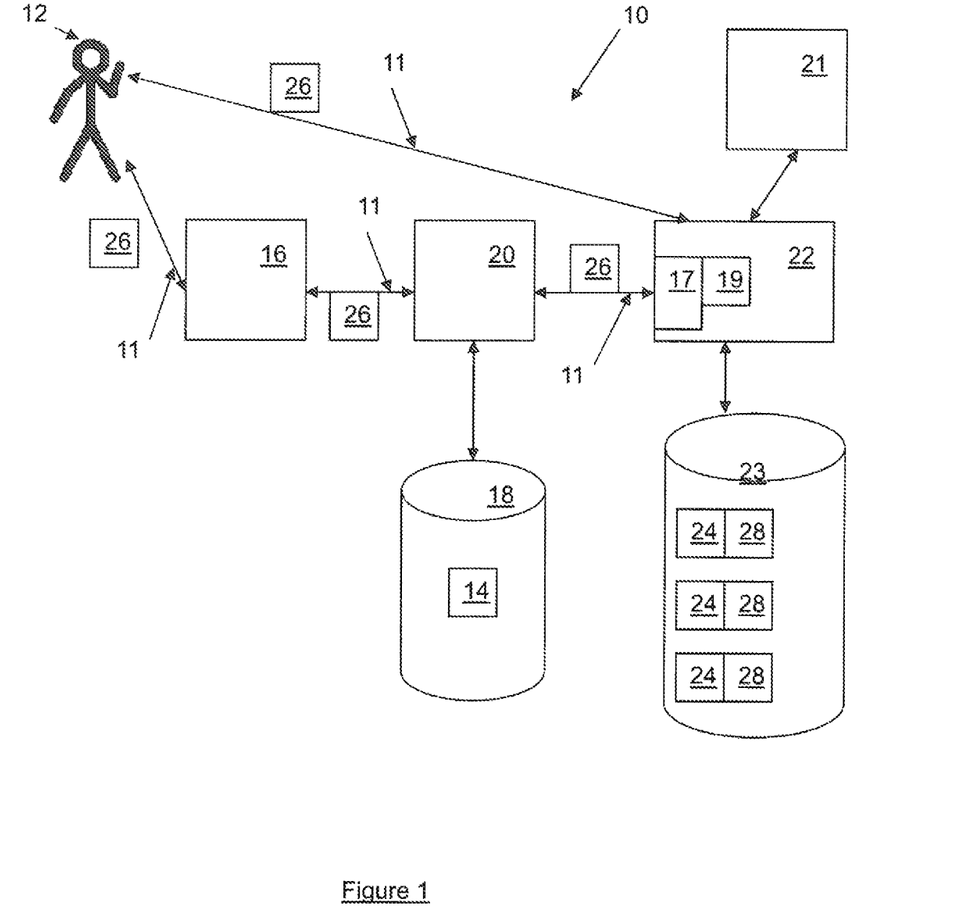
FIG. 1 is a block diagram of components of a domain verification system.
Figure 2:
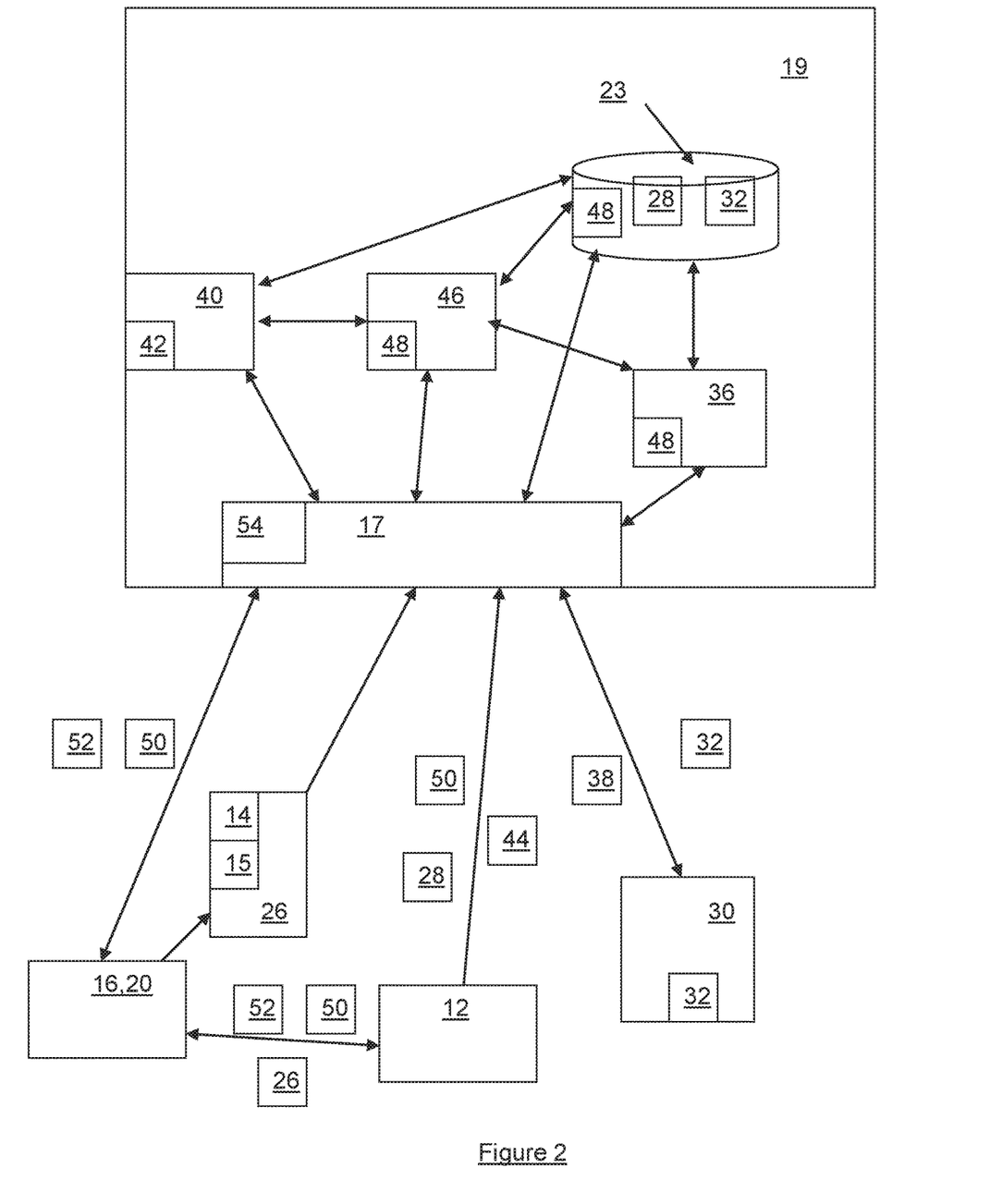
FIG. 2 is a block diagram of an example verification management module of a verification service for the system of FIG. 1.

Referring to FIGS. 1 and 2, shown is a domain name verification system 10 providing for a domain name registrant 12 (e.g. domain owner) to request 26 (including a domain event 15 such as new domain name 14 registration) and obtain over a communications network 11 a domain name 14 from a domain name registrar 16 for domain name 14 available (e.g. not yet claimed) in a domain name registry 18 (e.g. a database of all domain names registered in a top-level domain (TLD)), which is managed by a registry operator 20. The domain name verification system 10 can also provide for the domain name registrant 12 to manage over the communications network 11 the domain name 14, via the domain name registrar 16, for instructions in the request 26 (e.g. including the domain event 15 such as deletion of an existing domain name 14 registration) relating to their domain names 14 already registered (e.g. claimed) in the domain name registry 18. The domain name registry 18 functions as a database of all domain names 14 and associated registrant information in the domains of a Domain Name System (DNS) of the network 11 (e.g. Internet), which facilitates third party entities to request administrative control of the domain name 14. The registry operator 20 is responsible for maintaining all administrative data of the domain name 14 and generation of a zone file which contains IP addresses of the name servers for each domain. Each registry operator 20 manages the registration of domain names 14 within the domains for which the registry operator 20 is responsible, controls the policies of domain name 14 allocation, and technically operates its TLD. It is recognized that the registry operator 20 can provide the function of the registrar 16, or can delegate that function to registrars 16 operating at arm's length from the registry operator 20. The domain name registrar 16 is an organization or commercial entity that manages the reservation of Internet domain names 14 by communicating with the registrant 12 over the communications network 11.

The registrar 16, when separate from the registry operator 20, is accredited (under contract) by the registry operator 20 in order for the registrar 16 to manage the reservation (e.g. provision of registration services) of the domain names 14 (of the registry operator 20) with the registrant 12 on behalf of the registry operator 20. An end user (e.g. registrant 12) selects a registrar 16 to provide the registration service, and that registrar 16 becomes the designated registrar 16 for the domain name 14 chosen by the user 12. Preferably, only the designated registrar 16 can send modify or delete information to the registry operator 20 for domain names 14 in the central registry database 18.

Figure 4:
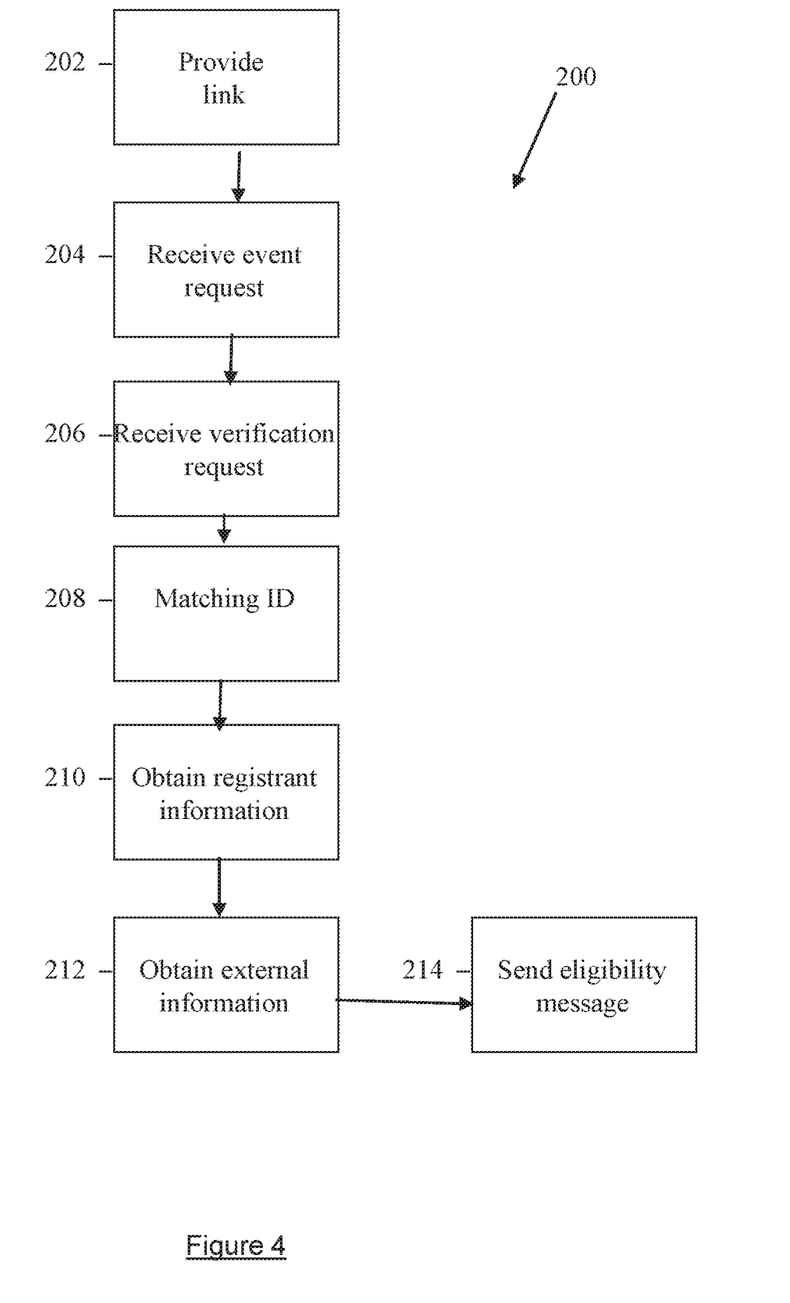
FIG. 4 is an example operation of the system of FIG. 1.

The domain name verification system 10 further includes a verification management module 19 that can be hosted by a verification service 22, which is in communication with the registrant 12, the registrar 16 and/or the registry operator 20 during a verification process 200 (see FIG. 4). Network 11 access with the verification management module 19 can be provided as a network interface 17 operating as a web portal for the parties 12,16,18,20,22, such that the verification service 22 is operated as a web service to provide machine to machine interaction over the network 11 for implementation of the verification process 200. The verification service 22 can be configured as a set of web services to facilitate verification of registrant 12 eligibility criteria with respect to the instructions in the request 26 received by the registrar 16 or registry operator 20 for a domain event 15 (e.g. an action 15 on an object of the domain name 14, further discussed below—see FIG. 2). An advantage of the verification system 10 is that it can be used by the registrars 16 and the registry operators 20 to provide a chain of trust between the registrant 12 and registration/maintenance of the domain name 14 using a flexible verification mechanism involving verification between the interested parties 12,16, 18,20,22.

Preferably, the communications network 11 comprises a wide area network such as the Internet, however the network 11 may also comprise one or more local area networks 11, one or more wide area networks, or a combination thereof. Further, the network 11 need not be a land-based network, but instead may comprise a wireless network and/or a hybrid of a land-based network and a wireless network for enhanced communications flexibility. For example, the communications network 11 can also include Bluetooth™ associated elements. It is recognised that the domain name registrar 16, the registry operator 20 and the verification service 22 can be implemented on computer devices 100 (see FIG. 3), such as servers, desktops, etc., and can communicate with one another via the network 11 in client-server relationships.

The verification management module 19 can be configured to review domain name events 15 (e.g. create/update/ delete) by verifying (e.g. registrant 12 is eligible to perform such events) these event requests 26 (containing the domain events 15 associated with a domain name 14) are provided directly by the registrant 12 of the domain name 14 (e.g. the domain name owner). When the registrar 16 and/or registry operator 20 receives these domain name events 15 as part of received request instructions 26, the verification management module 19 can broker on behalf of the registrar 16 and/or registry operator 20 verification of the eligibility of the registrant 12 to make such a domain event request 26. For example, upon receiving the request 26, the registrar 16 and/or registry operator 20 can place the associated domain name 14 on a hold status (i.e. restricting or otherwise inhibiting application of the domain event 15 or any other domain event 15 against object(s) of the domain name 14, for example perfecting a new registration for the domain name 14, deleting a registration of the domain name 14, etc., until the event request 26 is verified by the verification management module 19. As such, once the event request 26 is verified by the verification management module 19, the verification management module 19 can confirm the event request 26 as eligible to the registrar 16 and/or registry operator 20, thus facilitating the registrar 16 and/or registry operator 20 to remove the hold status and allow for completion or otherwise perfecting of the domain event 15. As further described below, operation of the verification management module 19 can provide an automated verification service to the registrar 16 and/or registry operator 20 for domain events 15, for example in comparison of registrant provided verification information 28 with verification information 32 external to the registrant 12 (e.g. from verification sources 30 specified by the registrar 16 and/or registry operator 20). For example, as further described below, the external verification information 32 can be obtained by the verification management module 19 using a search engine 36 requesting search queries 38 from the verification sources 30. The verification management module 19 can obtain the registrant provided verification information 28 directly from the registrant 12 and/or indirectly from information stored in the storage 23 provided in previous request (communications) 26 with the registrant 12.

The management module 19 can have a member validation portal 40 to provide account 42 creation and login capabilities to the management module 19 by the registrants 12 via a respective registrant member account 42. For example, a restricted UI of the registrant member account 42 can be provided (e.g. used as existing or setup if new member) for those registrants 12 who have purchased domain names 14 from the registrar 16. Once signed in to their member account 42, the registrant 12 can submit registrant verification information 28 (e.g. name, address, license number of registrant's organization, etc.) for use in evaluating the eligibility of the registrant 12 to complete the requested domain event 15 using the verification rules 48. Registrant identification information 44 provided to the member validation portal 40 can be information such as but not limited: a) registrant information (e.g. name, address, etc.) used in creating the member account 42 and establishing login credentials (e.g. user name and password); or b) login credentials for logging in to their account 42. During this interaction with the member validation portal 40, the registrant 12 can choose a username, password and/or provide First name, Last Name and valid email address (e.g. login credentials). The registrar 16 or registry operator 20 can also provide to the member validation portal 40 a number of security questions or security information that can be validated by the registrant 12 during creation and/or login to their account 42. Registrant 12 email address provided during interaction can be validated by the member validation portal 40 by sending a validation email to the registrant 12 for confirmation, as desired. The registry operator 20 can choose to validate the email address or not. As part of the signup and/or login process for the account 42, an option is to collect contact/identification information 44 with the signup/login and have an option to choose which fields are mandatory and which are optional. Contact/identification information 44 can include the following information, by example, registrant 12 first name, registrant 12 last name, registrant 12 title, registrant 12 role with respect to the domain name 14, registrant 12 address (e.g. physical address, email address), registrant 12 phone number(s), registrant 12 ID (e.g. account 42 name) with the verification management module 19, which can be provided during account 42 setup as well as for subsequent login as part of the verification process 200 (see FIG. 4).

Once logged in to their account 42, the registrants 12 can claim their eligibility for the requested domain event 15 (e.g. to claim their domain name 14 that has been created through Registrar 16) using a secure claim ID 50 process. As further described below, ClaimID(s) 50 are returned to registrars 16 (or registry operators 20) during domain name 14 registrations (or other events 15) and registrars 16 (or registry operators 20) can provide the claimed ID 50 with network links 52 (e.g. URLs of the network 11 pertaining to the web portal 17) to reach the validation portal 17 and subsequently prove the domain name 14 ownership by the verification process 200 (see FIG. 4). It is recognized that the registrant provided verification information 28 for proving eligibility can include uploading scan documents to the web portal 17. Further, comparison/matching of the registrant provided verification information 28 with the external verification information 32 can be performed by a comparison engine 46 executing an eligibility rule set 48 (e.g. specified verification criteria) specified by the registrar 16 and/or the registry operator 20, as desired.

As such, registrar 16 and/or registry operator 20 integration can be achieved through the use of the messaging (e.g. via a message broker and epp protocol) for the collection and verification of the registrant identification information 44. Integration of the verification with the registrar 16 and/or registry operator 20 includes receiving domain create/update/delete events and putting domains on hold and removing the hold status. The system 10 can provide an automated validation service to the registrar 16 and/or registry operator 20 that is based on organizational data provided such as external verification information 32 (e.g. scraped from the web).

A review interface 54 can be coupled to the comparison engine 46 for domain name 14 owners (e.g. registrants 12) and/or customer service agents of the management module 19 to manage (e.g. automatically and/or manually) registrants' 12 domain eligibility applications (e.g. submitted claim ID 50 and verification information 28 for a specified domain name event 15 associated with a specified domain name 14). It is also recognized that owners and/or Customer Service agents can create new admin/auditor role users for the review interface 54, for example providing interface functionality such as but not limited to: view and manage registrant eligibility applications, including pass/fail with notes; provide admin/auditors to assign and manage their assigned audit cases (e.g. manual review of passed/failed eligibility applications); add/remove server Hold (domain name 14 hold) as needed with notes to indicate the reasons; view history on the eligibility application process and updates; provide up-to-date statistics on accounts 42, domain names 14 and eligibility applications status. The review interface 54 can also be used to establish or otherwise update the verification criteria and associated business logic of the verification rules 48.

The verification rules 48 can include information provided by the registrar 16 and/or registry operators 20 including the criteria to be used during the verification process 200, for example as implemented by the comparison engine 46 and/or the search engine 36. Examples of the verification rules 48 can be:

a. Filed Set 28: What verification information 28 the management module 19 needs to collect from the registrant 12 in order to facilitate auto validation by the comparison engine 46 (e.g. including matching capabilities of the search engine 36) and/or for manual validation (e.g. by agent via the portal 54 in cooperation with the comparison engine 46 to either review failed automated verification or to manually conduct all or a certain number of stages/steps of the verification process 200). This verification information 28 can include some text key value pair, multiple options and documents (name, address, license number of registrant organization, etc.).

b. Auto verification matching rules 48: the management module 19 has defined what information 32 gathered by the search engine 36 via provided data sources 30 (e.g. credential databases) over the network 11 could be used to match against the information 28 provided by the registrant 12. The rules 48 around verification can include matching thresholds such as exact or canonical matches and even list of rules or single rule, as desired (for example, canonical matches/mapping can include removal of non-alpha-numerical characters for the purposes of matching such as quote characters or hyphens, stripping out text strings like "ltd", "inc", and "co", concerning thresholds represents handling typographical errors to facilitate allowing for matches based on a defined percentages/number of character errors)

c. Manual Validation matching rules 48: the registrar 16 and/or registry operators 20 can specify what needs to be done when verification submissions of information 28 by the registrant 12 fails during auto verification during the verification process 200, and/or a particular step or steps of the verification process 200 is/are specified to include manual involvement by the agent or others via the review portal 54. For example,    i. Management module 19 can force registrants 12 to submit (upload) documents as the verification information 28 to prove their eligibility. This type of application can be queued for manual verification by Auditors via the portal 54. The registrar 16 and/or the registry operators 20 can specify what type of files (pdf, png, jpeg, doc), they would like to accept, number of files, and/or max file size as part of the verification rules 48.

ii. Pre-Live Sampling: the management module 19 can be configured to randomly choose some application information 28 submissions (either in whole or in part) by the registrant 12 for manual validation from auto validation failed applications and let all other applications to pass automatically.

iii. Post-Live Sampling: the management module 19 can be configured to choose a specified percentage of samples from auto failed applications to review subsequently.

The management module 19 can also implement a verification period, whereby if a determination of deemed eligible or not has not been concluded by a specified time period (e.g. time period measured from submission of verification information 28 to the management module 19 by the registrant 12 to final eligibility verification, time period measured from submission of a domain event to the registrar 16 and/or registry operator 20 by the registrant 12—for example a new domain name 14 registration request—to final eligibility verification, time period from receipt of a claim ID from the registrar 16 and/or registry operator 20 to final eligibility verification, etc.). The verification period can be used to inhibit domain name 14 booking (reserve) by the registrant 12 who may not be eligible to own the domain name 14. As such, the management module 19 in conjunction with the registrar 16 and/or registry operator 20 can be configured to delete the domain event (e.g. new domain name 14 registration) that has not been completed verification by the management module 19 within the specified (e.g. as part of the verification rules 48) verification period. The registrar 16 and/or registry operator 20 could indicate in the verification rules 48 how long (i.e. defined time period) the registrant 12 has in order to complete verification process 200. For example, domain events that have not been associated with any active application (e.g. submission of verification information 28 currently under consideration by the management module 19) or not submitted for verification (e.g. no verification information 28 yet received by the management module 19 associated with the claim ID 52) can be deleted (e.g. eligibility denied) once this period expires. A consideration with the verification period, as part of the verification rules 48, is whether the registrar 16 and/or registry operator 20 consider the registrant 12 is eligible for refund or not and if the registrant 12 is eligible for refund, then the validation period could be less than a defined add grace period (for example a period of 5 days or other as specified by a regulatory body).

The search engine 36 (e.g. elastic search) can be configured to access or otherwise be provided the registrant verification information 28, to index the information 28, and provide a flexible interface to construct queries 38 to apply against the information sources 30 and to cooperate with the comparison engine 46 (e.g. using either exact and canonical matching algorithm) to obtain the information 32 and compare any matching with the information 28.

Domain Names 14

It is recognized that that the domain names 14 can be such as but not limited to: a set of Top Level Domains (TLDs) of the same second level domain; a set of second level domains (SLDs) of the same third level domain; a set of Top Level Domains (TLDs) of different second level domains; a set of second level domains (SLDs) of different third level domains; and/or lower level domains. As such, second-level and third-level domain names can typically be open for reservation by end-users (registrant 12) who wish to connect local area networks to the Internet 11, create other publicly accessible Internet 11 resources, and/or run web sites. The registration and management of these domain names 14 is administered by the domain name registrars 16 who sell their services to the public (i.e. registrants 12). The TLD names 14 such as .info, .org, .mobi are the highest level of domain names of the Internet 11. Top-level domains form a DNS root zone of a hierarchical Domain Name System implemented on the Internet 11. Every domain name 14 ends with a top-level domain label. Below the top-level domains in the domain name hierarchy are the second-level domain (SLD) names 14. These are the names directly to the left of the top-level domains. As an example, in the domain example.co.info, co is the second-level domain. Second-level domains commonly refer to an organization (e.g. registrant 12) that registered the domain name 14 with the domain name registrar 16. Some domain name registries 18 introduce the second-level hierarchy to the TLD that indicates a type of entity intended to register an SLD under it, for example, in the .org namespace a college or other academic institution could register under the .ac.org SLD, while companies could register under .co.org. Next are third-level domain names 14, which are written immediately to the left of the second-level domain, recognising that there can be fourth- and fifth-level domains, and so on, with virtually no limitation.

Domain names 14 can be referred to as domains and domain name registrants 12 can be referred to as domain owners, although domain name registration with the registrar 16 may not confer any legal ownership of the domain name 14, only an exclusive right of use for a particular duration of time. As such, the domain name 14 can be considered an economic asset utilized as an identification string defining a realm of administrative autonomy, authority or control within the Internet 11. The domain names 14 are formed by the rules and procedures of the Domain Name System (DNS), such that any name registered in the DNS is a domain name 14. Domain names 14 can also be thought of as a location on the internet 11 where certain information or activities can be found. A fully qualified domain name (FQDN) is a domain name 14 that is completely specified in the hierarchy of the DNS, having no parts omitted.

In terms of importance to functioning of the Internet 11 for searching for and accessing Internet 11 resources, domain names 14 serve as names for these Internet 11 resources such as computers, networks, and services. The domain name 14 represents an Internet Protocol (IP) resource and specifically, individual Internet host computers use domain names 14 as host identifiers, or host names (e.g.

leaf labels in the domain name system usually without further subordinate domain name space). Of importance to Internet 11 navigation, host names appear as a component in Uniform Resource Locators (URLs) for Internet 11 resources such as web sites (e.g., Afilias.org). Domain names 14 can also be used as simple identification labels to indicate ownership or control of a resource. Such examples are the realm identifiers used in the Session Initiation Protocol (SIP), the Domain Keys used to verify DNS domains in e-mail systems, and in many other Uniform Resource Identifiers (URIs). An important function of domain names 14 is to provide easily recognizable and memorizable names to numerically addressed Internet 11 resources. Usability of the domain names 14 as an abstraction provides any resource to be moved to different physical locations in the address topology of the network 11, globally or locally in an intranet. Such a move usually involves changing the IP address of the resource and the corresponding translation of this IP address to and from its domain name 14. It is important for the system 10 to facilitate registration/management of the domain names 14 for a particular registrar 16 via a common platform to facilitate processing of instructions of the request 26 and associated payment(s).

Registration and maintenance of domain names 14 involves management of objects associated with each of the domain names 14 in the registry 18. These objects are populated with appropriate data based on action(s) 15 performed on the objects (e.g. update/modification, delete/del, transfer, renew, etc.). Example actions 15 on the objects are such as registration/purchase of the domain names 14 by the registrant 12 from the registrar 16. Other example actions 15 on the objects can include management by the Registry Operator 20 of up-to-date data in the objects concerning domain name and name server registrations maintained by the Registry Operator 20, useful in verifying and providing operational stability of Registry Services and the DNS.

The specification of the content and format of this data of the objects (on which any of the actions 15—e.g. domain events can be transacted) can be such as but not limited to:
1. Registrar Objects.
The registrar object corresponds to a single registrar. It includes the following data:
Registrar ID (conforming to the IANA registrar-ids registry)
Contact ID of Registrar
Registrar Administrative Contacts
Registrar Technical Contacts
Registrar Billing Contacts
Registrar URL
Registrar Creation Date
Registrar Last Updated Date
2. Contact Objects.
The contact object corresponds to a single contact (whether registrant, administrative, technical or billing contact). The contact object includes the following data:
Contact ID
Contact Name
Contact Organization
Contact Address, City, State/Province, Country
Contact Postal Code
Contact Phone, Fax, E-mail
3. Nameserver Objects.
A nameserver object corresponds to a single registered nameserver. The nameserver object includes the following data:
Name Server ID
Name Server Host Name
Name Server IP Addresses if applicable
Current Registrar
Name Server Creation Date
Name Server Last Updated Date
4. Domain Objects.
The domain object corresponds to a single Registered Domain Name. Each domain object includes the following data:
Domain ID
Domain Name
Sponsoring Registrar
Domain Status
All contact information (including all details) with at least one each of:
  Registrant
  Administrative
  Technical
  Billing
All nameservers associated with this domain
Domain Registration Date
Domain Expiration Date
Domain Last Updated Date It is recognized that registrant 12 itself can communicate directly with the registrar 16, the Registry Operator 20 and/or the verification service 22 for registration and/or maintenance information requests 26 used in registration and maintaining of the domain names 14 via coordinating the data content of the objects, and/or can communicate registration and/or maintenance information requests 26 indirectly with the verification service 22 via registry operator 20 and/or the registrar 16. Further, registry operator 20 can supply any requested registration and/or maintenance information for the request 26 to the verification service 22 on behalf of registrant 12. As such, the registration and/or maintenance information can include data used to populate the objects based on domain events/actions 15 (e.g. update, delete, transfer, renew, etc.) performed on the objects.

An action or domain event 15 is defined as an operation on an object unique to each of the plurality of domain names 14 of the DNS. An example action 15 can be assigning the domain names 14 to a new domain name registrant 12. Alternative actions 15 can include actions 15 such as but not limited to check, info/status, update/mod, delete/del, transfer, and/or renew.

The action 15 can be based on a protocol such as Extensible Provisioning Protocol (EPP) or Registry Registrar Protocol (RRP). The Extensible Provisioning Protocol (EPP) is a flexible protocol designed for allocating objects within registries 18 over the Internet. EPP provides a robust and flexible protocol that facilitates transaction communications between domain name registries 18 and domain name registrars 16. These transactions are used whenever a domain name 14 is acted upon using actions 15 such as to affect data content of the domain name objects to reflect registered, transferred, renewed or otherwise amended domain names 14. Also, EPP authInfo "codes" or "keys" can be communicated with actions 15 in order to affect object data changes for the transfer of domain names 14 between registrars 16. As such, the EPP protocol is used to implement an order (request action 15 on an object) and fulfilment (perform and report result of object when acted upon) system. Specified in XML, EPP provides four basic service elements: a greeting, commands (e.g. actions 15), responses (e.g. to the actions 15 effecting changes to data content of the objects associated with the actions 15), and an extension framework that supports future definition of managed objects and the relationship of EPP protocol requests (e.g.

actions 15) and responses to those objects. It is recognised that actions of EPP are expressed as XML, a structured, text-based format, such that communication over the network 11 of the actions between entities 12,16,18,20,22 can be specified over TCP communication messaging and/or other transport communication messaging such as BEEP, SMTP, or SOAP.

The registries 18 can also contain a transaction log/history (e.g. EPP) containing all operations (a consequence of actions 15) executed on the objects of the domain names 14, such that the log/history indicates the domain name 14 by domain name ID along with details of the operation(s) (e.g. time of transaction, success of transaction, type of operation, etc.).

It is recognised that the entities 12,16,18,20,22 can interact on the network 11 with one another in client server pairs. For example, the registrar 16 can be the EPP client and the registry 18 (with associated registry operator 20) can be the paired EPP server. In general, an EPP server responds to a successful connection by returning a greeting to the client. The client waits for the greeting before sending an EPP command (i.e. action) to the server. EPP commands and responses are exchanged serially between the client and the server over the network 11, in order to affect the data contents of the corresponding objects that are acted upon by the action 15 implemented by the server (i.e. as requested by the client). The server responds to each EPP command with a coordinated response that describes the results of processing the command.

EPP commands fall into three categories: session management commands, query commands, and data transform commands. Session management commands are used to establish and end sessions with an EPP server. Query commands are used to perform read-only, object-based information retrieval operations with respect to data contents of the objects. Transform commands are used to perform read-write object management operations (e.g. actions 15) with respect to the data contents of the objects.

EPP provides commands to manage sessions, retrieve object information, and perform transformation operations on objects. All EPP commands are atomic and idempotent, either succeeding completely or failing completely and producing predictable results in case of repeated execution. EPP provides three commands/actions 15 to retrieve object information: action <info> to retrieve detailed information associated with a known object, action <ping> to determine if an object is known to the server, and action <transfer> to retrieve known object transfer status information. EPP provides five commands/actions 15 to transform (i.e. modify the data contents of the object) objects: action <create> to create an instance of an object with a server, action <delete> to remove an instance of an object from a server, action <renew> to extend the validity period of an object, action <update> to change information associated with an object, and action <transfer> to manage changes in client sponsorship (e.g. change in registrant 12) of a known object. As such, instance of an object refers to the specific data contents of an object. EPP uses four decimal digits to describe the success or failure of each EPP command. The four digits of the reply each have special significance. The first digit denotes whether the response submitted by the server back to the client marks command success or failure. A client that wants to know approximately what kind of error occurred (command syntax error, security error, system error, etc.) can examine the second digit. The third and fourth digits are used to provide explicit information detail by the server to the client with respect to the results of command execution and object data contents change thereby.

The instructions of the request 26 pertaining to registration and maintenance of domain names 14 in the domain name portfolios 24 involves management of objects associated with each of the domain names 14 in the domain name portfolio 24. These objects are populated with appropriate data based on action(s) 15 performed on the objects (e.g. update/modification, delete/del, transfer, renew, etc.) as specified in the instructions 26.

One example of the request 26 is a new domain name 14 registration with associated payment that is received by the registry operator 20 from the registrar 16. As shown in FIG. 2, the request 26 can include one or more actions 15, one or more domain names 14, such that in this example the actions 15 are performed by the registry operator 20 (e.g. prior to receipt of the confirm or deny of eligibility from the verification management module 19, after receipt of the confirm of eligibility from the verification management module 19, rescind of implemented action 15 after receipt of the deny of eligibility from the verification management module 19, etc.) and a record of the actions 15 can be forwarded by the registry operator 20 to the registrar 16.

The Domain Verification process 200 can begin when the registrant 12 successfully registers the domain name 14 at a registrar's 16 site, and/or when the registrant 12 sends one or more domain events 15 to the registrar 16 for already registered domain names 14. The following FIG. 4 illustrates by example only the steps involved in verification 200 across the participants of: registrant 12, registrar 16, registry 20 and verification service 22. Verification services can utilize the registrant information 28,44 provided. This information 28,44 can be specific to criteria of the registrar 16 and/or registry operator 20 as desired. The verification management module 19 can be built to either accept some basic text information 28,44, or to accept complex data sets including file upload capabilities, for example. The verification management module 19 can interact over the network 11 with external data sources 30, for example as specified by the registrar 16 and/or registry operator 20 via the rules 48. Once the registrant 12 has been verified during the first verification process 200 (e.g. for domain name 14 registration), any subsequent further domain events 15 (e.g. subsequent domain name 14 registrations) by the same registrant 12 can be automatically verified using previously provided data 28, once the registrant 12 has been validated via login to their account 42 via providing of the registrant identification information 44.

The verification management module 19 can receive the request 26 (e.g. associated with actions to register a new domain name 14, renew a registered domain name 14, etc.) and can implement the verification process 200 to confirm or deny eligibility of the registrant 12 to provide the request 26 for any domain names 14, further described below. It is recognized that any registration/management actions 15 contained in the request 26 can be processed directly by the verification service 22 and/or can be forwarded to the registry operator 20 for processing as desired.

Referring to FIGS. 1, 2 and 4, the domain verification system 10 can provide for the domain name registrant 12 to register and/or manage over the communications network 11 the domain name 14, via the domain name registrar 16, using instructions 26 relating to their domain names 14 unregistered (e.g. unclaimed) or already registered (e.g. claimed) in the domain name registry 18. The system 10 includes the verification management module 19 that can be hosted by the verification service 22. The request 26 themselves can be received by a network (e.g. web) interface 17 of the portfolio management module 19 from the registrant 12, from the registrar 16, and/or the registry operator 20.

Referring to FIGS. 1, 2 and 4, shown is an example operation for verifying via the verification process 200 for verifying eligibility of a domain name registrant 12 via a validation web interface 17 for a domain name 14 either registered or in the process of registration with a registrar 16 in conjunction with a registry operator 20 over a communications network 11. At step 202, the management module 19 provides a network link 52 to the registrar 16 or to the registry operator 20 of the domain name 14, the network link 52 being of the communications network 11 for the validation web interface 17 for use by the registrant 12 in connecting with the verification web interface 17. At step 204, the management module 19 receives an event request 26 for the domain name 14 via the verification web interface 17 from either the registrar 16 or the registry operator 20 of the domain name 14, the event request 26 including a claim ID 50 associated with the domain name 14 for a domain event 15 on the domain name 14. At step 206, management module 19 receives a verification request 26 from the registrant 12 using the network link 52 via the validation web interface 17, the verification request 26 including a registrant claim ID 50 and registrant identification information 44 (e.g. to create or otherwise login to the member account 42 with the member validation module 40), the registrant claim ID 50 previously provided to the registrant 12 by the registrar 16 or the registry operator 20 as part of the verification process 200. At step 208, the management module 19 confirms matching of the registrant claim ID 50 with the claim ID 50 (e.g. via the comparison engine 46 in order to verify or otherwise associate the registrant 12 with the domain event 15 under consideration by the registrar 16 and/or the registry operator 20). At step 210, the management module 19 obtains registrant verification information 28. At step 212, the management module 19 accesses external verification information 32 from the information sources 30 via the search engine 36 and compares against the registrant verification information 28 using a set of verification rules 48 in order to determine whether the eligibility is: 1) confirmed when the registrant verification information 28 matches the external verification information 32; or unconfirmed when the registrant verification information 28 does not match the external verification information 32 as a result of the compare. At step 214, the management module 19 sends to the registrar 16 and/or the registry operator 20: 1) a confirm domain event message if the eligibility is confirmed; or 2) a deny domain event message if the eligibility is unconfirmed.

It is recognised that the domain event 15 can be a create event, the event request 26 can be a registration request, the confirm domain event message can be removal of a domain hold state by the registry operator 20, and the deny domain event message can be deletion of the domain name 14 with the registrant 12 either registered or in the process of registration with the registry operator 20. Alternatively, the domain event 15 can be an update event, the event request 26 can be an update request, the confirm domain event message can be apply update event, and the deny domain event message can be disregard update event. Alternatively, the domain event 15 can be a delete event, the event request 26 can be a delete request, the confirm domain event message can be apply delete event, and the deny domain event message can be disregard delete event. Alternatively, the domain event 15 can be a renew event, the event request 26 can be a renew request, the confirm domain event message can be apply renew event, and the deny domain event message can be disregard renew event. Alternatively, the domain event 15 can be a transfer event, the event request 26 can be a transfer request, the confirm domain event message can be apply transfer event, and the deny domain event message can be disregard transfer event.

It is recognised that obtaining of the registrant verification information 28 can be from the registrant 12 via the verification web interface 17. Alternatively, the obtaining of the registrant verification information 28 can be from the storage 23 coupled to the computer processor as the registrant verification information 28 was provided by the registrant 12 previous to receiving the event request 26.

It is recognised that the verification process 200 can include verification of a subsequent further event request 26 including a further domain event 15 (e.g. delete after registration, registration of a second domain name after a first domain name, etc.).

In view of the above descriptions of storage 18,23 for the computer devices 100 (see FIG. 3) of registrant 12, registrar 16, registry operator 20, verification service 22, storage 18,23 can be configured as keeping the stored data in order and the principal (or only) operations on the stored data are the addition/amendment of or removal of the stored data from storage 18,23 (e.g. FIFO, FIAO, etc.). For example, storage 18,23 can be a linear data structure for containing and subsequent accessing of the stored data and/or can be a non-linear data structure for containing and subsequent accessing of the stored data.

Further, storage 18,23 receives various entities such as data that are stored and held to be processed later. In these contexts, storage 18,23 can perform the function of a buffer, which is a region of memory used to temporarily hold data while it is being moved from one place to another (i.e. between the between computer devices 100). Typically, the data is stored in the memory when moving the data between processes within/between one or more computers. It is recognised that storage 18,23 can be implemented in hardware, software, or a combination thereof. The storage 18,23 is used in the network system 10 when there is a difference between the rate/time at which data is received and the rate/time at which the data can be processed (e.g. ultimately by the devices 100).

Further, it will be understood by a person skilled in the art that memory/storage 18,23 described herein is the physical place where data can be held in an electromagnetic or optical form for access by the computer processors/modules. There can be two general usages: first, memory is frequently used to mean the devices and data connected to the computer through input/output operations such as hard disk and tape systems and other forms of storage not including computer memory and other in-computer storage. Second, in a more formal usage, memory/storage 18,23 has been divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

A database is one embodiment of memory 18,23 as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Computer databases typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory/storage 18,23 can also be defined as a physical electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in the computer.

In terms of a server, it is recognised that the computer devices 100 can be configured as hardware, software, or typically a combination of both hardware and software to provide a network entity that operates as a socket listener. It is recognised that any computerised process that shares a resource (e.g. data) to one or more client processes can be classified as a server in the network system 10. The term server can also be generalized to describe a host that is deployed to execute one or more such programs, such that the host can be one or more configured computers that link other computers or electronic devices together via the network 11. The computer devices 100 implementing functionality of registrant 12, registry operator 20, the registrar 16 and the verification service 22 can provide specialized services across the network 11, for example to private users inside a large organization or to public users via the Internet 11. In the network system 10, the servers can have dedicated functionality and/or can share functionality as described. Enterprise servers are servers that are used in a business context and can be run on/by any capable computer hardware. In the hardware sense, the word server typically designates computer models intended for running software applications under the heavy demand of a network 11 environment. In this client-server configuration one or more machines, either a computer or a computer appliance, share information with each other with one acting as a host for the other. While nearly any personal computer is capable of acting as a network server, a dedicated server will contain features making it more suitable for production environments. These features may include a faster CPU, increased high-performance RAM, and typically more than one large hard drive. More obvious distinctions include marked redundancy in power supplies, network connections, and even the servers themselves.

Figure 3:
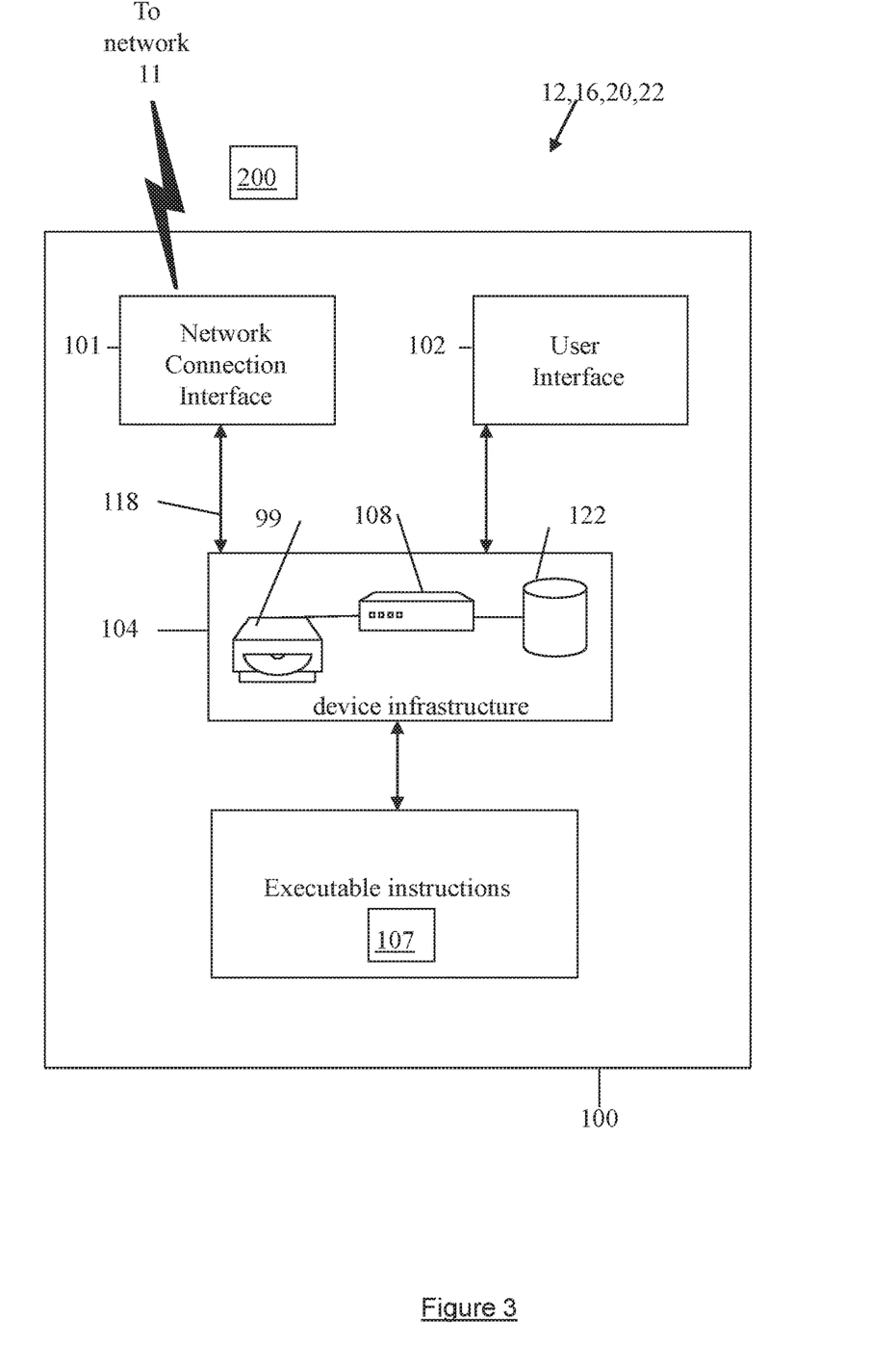
FIG. 3 is an example configuration of a computer device for system devices including of hosting the verification service of FIG. 2.

Referring to FIG. 3, a computing device 100 implementing functionality of registrant 12, registry operator 20, the registrar 16 and the verification service 22 can include a network connection interface 101, such as a network interface card or a modem, coupled via connection 118 to a device infrastructure 104. The connection interface 101 is connectable during operation of the devices to the network 11 (e.g. an intranet and/or an extranet such as the Internet), which enables the devices to communicate with each other as appropriate. The network 11 can support the communication of the communications/requests 26 and the related content.

Referring again to FIG. 3, the device 100 can also have a user interface 102, coupled to the device infrastructure 104, to interact with a user (e.g. server administrator—not shown). The user interface 102 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 104.

Referring again to FIG. 3, operation of the device 100 is facilitated by the device infrastructure 104. The device infrastructure 104 includes one or more computer processors 108 and can include an associated memory 122 (e.g. memory 18,23). The computer processor 108 facilitates performance of the device 100 configured for the intended task (e.g. of the respective module(s) 36,40,46,54,19 of verification service 22) through operation of the network interface 101, the user interface 102 and other application programs/hardware of the device 100 by executing task related instructions. These task related instructions can be provided by an operating system, and/or software applications located in the memory 122, and/or by operability that is configured into the electronic/digital circuitry of the processor(s) 108 designed to perform the specific task(s). Further, it is recognized that the device infrastructure 104 can include a computer readable storage medium 99 coupled to the processor 108 for providing instructions to the processor 108 and/or to load/update the instructions 107 (e.g. module 36,40,46,54,19). The computer readable medium can include hardware and/or software such as, by way of example only, magnetic disks, magnetic tape, optically readable medium such as CD/DVD ROMS, and memory cards. In each case, the computer readable medium may take the form of a small disk, floppy diskette, cassette, hard disk drive, solid-state memory card, or RAM provided in the memory module. It should be noted that the above listed example computer readable mediums can be used either alone or in combination.

Further, it is recognized that the computing device 100 can include the executable applications comprising code or machine readable instructions for implementing predetermined functions/operations including those of an operating system and the modules, for example. The processor 108 as used herein is a configured device and/or set of machine-readable instructions for performing operations as described by example above, including those operations as performed by any or all of the module 19. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example. Accordingly, any of the functionality of the modules may be implemented in hardware, software or a combination of both. Accordingly, the use of a processor 108 as a device and/or as a set of machine-readable instructions is hereafter referred to generically as a processor/module for sake of simplicity. Further, it is recognised that the services provider 22 can include one or more of the computing devices 100 (comprising hardware and/or software) for implementing the modules, as desired.

It will be understood in view of the above that the computing devices 100 may be, although depicted as a single computer system, may be implemented as a network of computer processors, as desired.

What is claimed is:

1. A computer implemented system providing an online verification process for verifying, at a verification server, eligibility of a domain name registrant for a domain name either registered or in the process of registration with a registrar over a communications network, the system comprising:
   a computer processor coupled to a memory for implementing instructions stored on the memory to:
   provide, by the verification server, a network link to the registrar or to a registry operator of the domain name, the network link of the communications network for use by the registrant in connecting with the verification server;
   receive, at the verification server, an event request for the domain name from either directly the registrar or directly a registry operator of the domain name, the event request including a claim ID linked with a specified domain event on the domain name, such that application of the event request against the domain name is inhibited by a hold status until said eligibility is verified;
   receive, at the verification server, a login request with login credentials from the registrant in order to log the registrant into an account of the registrant with the verification server;
   receive, at the verification server, a verification request directly from the registrant using the network link, the verification request including a registrant claim ID, the registrant claim ID previously provided to the registrant by the registrar or the registry operator as part of the verification process, the registrant claim ID linked with said specified domain event, the verification request separate from the event request;
   confirm, by the verification server matching of the registrant claim ID with the claim ID;
   obtain and collect, by the verification server, from one or more verification sources external verification information associated with the registrant, the one or more verification sources specified by at least one of the registrar or the registry operator;
   access, by the verification server, the external verification information and compare against registrant verification information of the registrant obtained external to the event request, said compare using a set of verification rules in order to determine whether said eligibility is:
   confirmed when the registrant verification information matches the external verification information; or
   unconfirmed when the registrant verification information does not match the external verification information as a result of said compare; and
   send, by the verification server, to either the registrar or the registry operator:
   a confirm domain event message if said eligibility is confirmed; or
   a deny domain event message if said eligibility is unconfirmed;
   wherein upon sending of the confirm domain name event message the hold status is removed to facilitate completion of the event request against the domain name.

2. The system of claim 1, wherein the event request is a result of the specified domain event communicated between the registrar and the registry operator previous to receipt of the event request.

3. The system of claim 2, wherein said specified domain event is a create event, the event request is a registration request, the confirm domain event message is removal of a domain hold state, and the deny domain event message is deletion of the domain name with the registrar either registered or in the process of registration.

4. The system of claim 2, wherein said specified domain event is an update event, the event request is an update request, the confirm domain event message is apply update event, and the deny domain event message is disregard update event.

5. The system of claim 2, wherein said specified domain event is a delete event, the event request is a delete request, the confirm domain event message is apply delete event, and the deny domain event message is disregard delete event.

6. The system of claim 2, wherein said specified domain event is a renew event, the event request is a renew request, the confirm domain event message is apply renew event, and the deny domain event message is disregard renew event.

7. The system of claim 2, wherein said specified domain event is a transfer event, the event request is a transfer request, the confirm domain event message is apply transfer event, and the deny domain event message is disregard transfer event.

8. The system of claim 2, wherein said obtain registrant verification information is from the registrant.

9. The system of claim 2, wherein said obtain registrant verification information is from a storage coupled to the computer processor as the registrant verification information is provided by the registrant previous to said receive the event request.

10. The system of claim 1, wherein the external verification information is obtained from the one or more verification sources using a search engine.

11. The system of claim 10, wherein the external verification information is obtained from the verification source via communication over the communications network between the server and the verification source.

12. The system of claim 11, wherein said communication is selected from the group consisting of: a network request and response based on a search query containing at least a portion of the registrant identification information; and importation from the verification source according to a scheduled frequency.

13. The system of claim 1 further comprising the computer processor coupled to the memory for implementing instructions stored on the memory to:
   receive a further event request for the domain name via the verification web interface from either the registrar or a registry operator of the domain name, the further event request including a further claim ID linked with a further specified domain event on the domain name, the further specified domain event different from said specified domain event, such that application of the further event request against the domain name is inhibited by a further hold status until a further eligibility is verified;

receive a further verification request from the registrant using the network link, the further verification request including a further registrant claim ID different from the registrant claim ID, the further registrant claim ID previously provided to the registrant by the registrar or the registry operator as part of the verification process for the further verification request;

confirm matching of the further registrant claim ID with the further claim ID;

obtain from a storage the registrant verification information previously provided by the registrant;

access the external verification information and compare against the registrant verification information using a set of verification rules in order to determine whether the further eligibility is:
  confirmed when the registrant verification information matches the external verification information; or
  unconfirmed when the registrant verification information does not match the external verification information as a result of said compare; and send to either the registrar or the registry operator:
  a further confirm domain event message if the further eligibility is confirmed; or
  a further deny domain event message if the further eligibility is unconfirmed;

wherein upon sending of the further confirm domain name event message the further hold status is removed to facilitate completion of the further event request against the domain name.

14. The system of claim 13, wherein the event request is a result of the further specified domain event communicated between the registrar and the registry operator.

15. The system of claim 13, wherein the domain name is a second domain name different from a previous domain name, the further specified domain event is a create event for the second domain name, and said specified domain event is a create event for the previous domain name.

16. The system of claim 13, wherein the further specified domain event is a delete event for the domain name and said specified domain event is a create event for the domain name.

17. The system of claim 13, wherein the further specified domain event is a transfer event for the domain name and said specified domain event is a create event for the domain name.

18. The system of claim 1, wherein the further specified domain event is an update event for the domain name and said specified domain event is a create event for the domain name.

19. The system of claim 1, wherein the further specified domain event is a renew event for the domain name and said specified domain event is a create event for the domain name.

20. The system of claim 1, wherein the domain name is for a specified Top Level Domain (TLD).

21. The system of claim 1, wherein the domain name is for a specified Second Level Domain (SLD).

22. A computer implemented system providing, at a verification server, an online verification process for verifying eligibility of a domain name registrant for a domain name registered with a registrar over a communications network, the system comprising:
  a computer processor coupled to a memory for implementing instructions stored on the memory to:
    provide, by the verification server, a network link to the registrar or to a registry operator of the domain name, the network link of the communications network for the verification web interface for use by the registrant in connecting with the verification server;
    receive, at the verification server, an event request for the domain name from either directly the registrar or directly a registry operator of the domain name, the event request including a claim ID linked with a specified domain event on the domain name, such that application of the event request against the domain name is inhibited by a hold status until said eligibility is verified;
    receive, at the verification server, a login request with login credentials from the registrant in order to log the registrant into an account of the registrant with the verification server;
    monitor, by the verification server, for a verification request received directly from the registrant using the network link, the verification request including a registrant claim ID, the registrant claim ID previously provided to the registrant by the registrar or the registry operator as part of the verification process, the registrant claim ID linked with said specified domain event, the verification request separate from the event request;
    determine, by the verification server, whether said eligibility, or not, for claiming the specified domain event by using the registrant claim ID has been concluded by a specified verification period; and
    send, by the verification server, to either the registrar or the registry operator:
      a process event message if said eligibility is confirmed; or
      a disregard event message if said eligibility is unconfirmed
    wherein upon sending of the confirm domain name event message the hold status is removed to facilitate completion of the event request against the domain name.

23. A system according to claim 22, wherein the verification period is selected form the group consisting of: a time period measured from submission of the registrant verification information to final eligibility verification; a time period measured from submission of said specified domain event to the registrar or registry operator by the registrant to final eligibility verification; and a time period from receipt of the claim ID from the registrar or registry operator to final eligibility verification.

24. A computer implemented method for providing, at a verification server, an online verification process for verifying eligibility of a domain name registrant for a domain name either registered or in the process of registration with a registrar over a communications network, the method comprising implementation of instructions stored on the memory by a computer processor to:
  provide, by the verification server, a network link to the registrar or to a registry operator of the domain name, the network link of the communications network for use by the registrant in connecting with the verification server;
  receive, at the verification server, an event request for the domain name from either directly the registrar or directly a registry operator of the domain name, the event request including a claim ID linked with a specified domain event on the domain name, such that application of the event request against the domain name is inhibited by a hold status until said eligibility is verified;

receive, at the verification server, a login request with login credentials from the registrant in order to log the registrant into an account of the registrant with the verification server;

receive, at the verification server, a verification request directly from the registrant using the network link, the verification request including a registrant claim ID, the registrant claim ID previously provided to the registrant by the registrar or the registry operator as part of the verification process, the registrant claim ID linked with said specified domain event, the verification request separate from the event request;

confirm, by the verification server, matching of the registrant claim ID with the claim ID;

obtain and collect, by the verification server, from one or more verification sources external verification information associated with the registrant, the one or more verification sources specified by at least one of the registrar or the registry operator;

access, by the verification server, the external verification information and compare against registrant verification information of the registrant obtained external to the event request, said compare using a set of verification rules in order to determine whether said eligibility is:
confirmed when the registrant verification information matches the external verification information; or
unconfirmed when the registrant verification information does not match the external verification information as a result of said compare; and send, by the verification server, to either the registrar or the registry operator:
a confirm domain event message if said eligibility is confirmed; or a deny domain event message if said eligibility is unconfirmed;

wherein upon sending of the confirm domain name event message the hold status is removed to facilitate completion of the event request against the domain name.

* * * * *